United States Patent
Moriyasu

(10) Patent No.: US 9,443,440 B2
(45) Date of Patent: Sep. 13, 2016

(54) FIGURE PLATE SET

(71) Applicant: PASCAL CO., LTD., Kurashiki-shi, Okayama (JP)

(72) Inventor: Hiroki Moriyasu, Kurashiki (JP)

(73) Assignee: PASCAL CO., LTD., Kurashiki-shi, Okayama (JP)

( * ) Notice: Subject to any disclaimer, the term of this patent is extended or adjusted under 35 U.S.C. 154(b) by 0 days.

(21) Appl. No.: 14/656,715

(22) Filed: Mar. 13, 2015

(65) Prior Publication Data

US 2015/0194061 A1 Jul. 9, 2015

Related U.S. Application Data

(63) Continuation of application No. PCT/JP2013/077967, filed on Oct. 15, 2013.

(30) Foreign Application Priority Data

Oct. 17, 2012 (JP) .................. 2012-229989

(51) Int. Cl.
G09B 23/04 (2006.01)
G09B 1/34 (2006.01)
A63F 9/06 (2006.01)
(Continued)

(52) U.S. Cl.
CPC .............. *G09B 1/34* (2013.01); *A63F 9/0669* (2013.01); *G09B 1/30* (2013.01); *G09B 19/00* (2013.01); *G09B 23/04* (2013.01); *A63F 9/1044* (2013.01); *A63F 2009/0694* (2013.01); *A63F 2009/0697* (2013.01)

(58) Field of Classification Search
USPC ....... 434/188, 191, 196, 205, 208, 211, 212, 434/214; 273/157 R
See application file for complete search history.

(56) References Cited

U.S. PATENT DOCUMENTS 143,835 A * 10/1873 Muller ................ A63H 33/04
273/157 R
342,651 A * 5/1886 Southworth .......... G09B 19/02
434/196
(Continued)

FOREIGN PATENT DOCUMENTS

JP S48-015175 Y 4/1973
JP S55-034859 U 3/1980
(Continued)

OTHER PUBLICATIONS

International Search Report for PCT/JP2013/077967 dated Jan. 21, 2014.
(Continued)

*Primary Examiner* — Kurt Fernstrom
(74) *Attorney, Agent, or Firm* — Yokoi & Co., U.S.A.; Toshiyuki Yokoi

(57) ABSTRACT

The present invention provides a figure plate set (10) for learning that comprises a first triangular plate (1) that has an isosceles triangular shape having an apex angle of 108° and base angles of 36°; and a second triangular plate (2) that has an isosceles triangular shape having an apex angle of 36° and base angles of 72°, wherein a length of isosceles sides (7, 8) of the first triangular plate (1) is same as a length of isosceles sides (14, 15) or a bottom side (16) of the second triangular plate (2), and a new triangular shape can be formed by combining the first triangular plate (1) and the second triangular plate (2).

16 Claims, 13 Drawing Sheets

(51) Int. Cl.
    *G09B 19/00*    (2006.01)
    *G09B 1/30*    (2006.01)
    *A63F 9/10*    (2006.01)

(56) References Cited

U.S. PATENT DOCUMENTS

| | | | | |
|---|---|---|---|---|
| 1,173,298 | A * | 2/1916 | Montessori | G09B 23/04 434/211 |
| 1,261,710 | A * | 4/1918 | Coyle | A63F 9/10 273/157 R |
| 2,611,193 | A * | 9/1952 | Davis | G09B 19/02 434/196 |
| 2,885,207 | A * | 5/1959 | Wormser | A63F 9/10 273/157 R |
| 3,614,835 | A * | 10/1971 | Rice | B16B 5/0607 434/211 |
| 3,637,217 | A * | 1/1972 | Kent | A63F 9/12 273/157 R |
| 4,343,471 | A * | 8/1982 | Calvert | A63F 9/0669 273/157 R |
| 4,723,382 | A * | 2/1988 | Lalvani | E04B 1/3211 273/157 R |
| 4,913,436 | A * | 4/1990 | Li | A63F 9/10 273/157 R |
| 5,215,467 | A * | 6/1993 | Brischke | G09B 23/04 434/211 |
| 5,281,145 | A * | 1/1994 | Sidrak | G09B 23/04 434/211 |
| 5,470,234 | A * | 11/1995 | Sher | G09B 23/02 434/196 |
| 5,873,729 | A * | 2/1999 | Aghevli | G09B 1/40 273/157 R |
| D429,775 | S * | 8/2000 | Adelman | D21/478 |
| 6,145,837 | A * | 11/2000 | Silvey | A63F 9/12 273/157 R |
| 6,575,755 | B2 * | 6/2003 | Dreyfous | G09B 19/02 434/196 |
| 8,834,167 | B2 * | 9/2014 | Spotts | G09F 7/02 434/195 |
| 2006/0076732 | A1 * | 4/2006 | Chiou | A63F 9/10 273/153 R |

FOREIGN PATENT DOCUMENTS

| | | |
|---|---|---|
| JP | H07-004660 U | 1/1995 |
| JP | H09-285642 A | 11/1997 |
| JP | 3149263 U | 2/2009 |

OTHER PUBLICATIONS

PCT written openion dated Jan. 21, 2014.
Kei Shindo, '8. Daigaku Nyushi Mondai Kenkyu Seijikkakukei', 'Kyomu Essay (Sansu)—Sansugaku Nyumon'.
Nozomu Tanaka, 'Enshukaku to Chushinkaku', 'Chugaku kara Sugaku Daisuki'.

* cited by examiner

FIGURE PLATE SET

CROSS-REFERENCES TO RELATED APPLICATIONS

This Application claims the benefit of priority and is a Continuation application of the prior International Patent Application No. PCT/JP2013/077967, with an international filing date of Oct. 15, 2013, which designated the United States, and is related to the Japanese Patent Application No. 2012-229989, filed Oct. 17, 2012, the entire disclosures of all applications are expressly incorporated by reference in their entirety herein.

BACKGROUND OF THE INVENTION

1. Field of the Invention

The present invention relates to a figure plate set for learning.

2. Description of Related Art

Figure plates can be used as a learning material for understanding figures and geometry. If a plurality of figure plates is prepared and a combination of an arrangement of the figure plates is changed in a planar shape, various figures having different outer shapes can be formed. This helps a user to understand characteristics of the figures.

For example, in a teaching blackboard for calculating area of plane figures disclosed in Patent Document 1, a plurality of figure plates having a triangular shape is provided. On the blackboard, a combination of an arrangement of the figure plates is arbitrarily changed, and an outer shape formed by the plurality of figure plates can be changed to various triangles, a rectangle, and a parallelogram. This helps the user to understand various basic figures and calculation method of an area of various figures.

In addition, in a figure puzzle disclosed in Patent Document 2, four triangular cards are provided. By combining the triangular cards, basic shapes of the figure, such as a regular tetragon, a rectangle, a parallelogram, a rhombus, a trapezoid, and a triangle can be formed. By the above configuration, the user can operationally and visually understand basic shapes of the figure.

[Patent Document 1] Japanese examined utility model application publication No. S48-15175.

[Patent Document 2] Japanese unexamined utility model application publication No. S55-34859.

Although the figure plates and the triangular cards described above can help the user to understand the basic shapes generally, they are not suitable for helping the user to deepen the understanding of geometric thinking related to the figure. Specifically, in order to deepen the understanding of geometric thinking related to a regular pentagon, it is not enough even if only an outer shape and an inner angle of the regular pentagon are understood. Even if five triangular plates made by equally dividing the regular pentagon are used, the understanding cannot be deepened.

The present invention provides a figure plate set that helps the user to deepen the understanding of the geometric thinking related to the regular pentagon, which is a basic shape of the plane figures.

BRIEF SUMMARY OF THE INVENTION

The inventor of the present invention found that if two kinds of isosceles triangles to form the regular pentagon are prepared and the user combines the isosceles triangles, the user can deepen the understanding of a similarity relation and the understanding of a relation between angles of apexes and inner angles of the regular pentagon. Thus, the user can deepen the understanding of the geometric thinking related to the regular pentagon.

The present invention discloses a figure plate set for learning, comprising: a first triangular plate that has an isosceles triangular shape having an apex angle of 108° and base angles of 36°; and a second triangular plate that has an isosceles triangular shape having an apex angle of 36° and base angles of 72°, wherein a length of isosceles sides of the first triangular plate is same as a length of isosceles sides or a bottom side of the second triangular plate, and a new triangular shape can be formed by combining the first triangular plate and the second triangular plate.

In the figure plate set of the present invention, if the length of the isosceles sides of the first triangular plate is same as the length of the isosceles sides of the second triangular plate, an isosceles triangle having an apex angle of 36° and base angles of 72° can be newly formed by combining the first triangular plate and the second triangular plate, as shown in FIG. 2. In this case, the newly formed isosceles triangle has a similar shape as the second triangular plate. If the length of the isosceles sides of the first triangular plate is same as the length of the bottom side of the second triangular plate, an isosceles triangle having an apex angle of 108° and base angles of 36° can be newly formed by combining the first triangular plate and the second triangular plate, as shown in FIG. 3. In this case, the newly formed isosceles triangle has a similar shape as the first triangular plate.

On the other hand, the regular pentagon can be divided into two kinds of isosceles triangles: one is an isosceles triangle having an apex angle of 108° and base angles of 36°, and the other is an isosceles triangle having an apex angle of 36° and base angles of 72°. All the triangular plates included in the figure plate set of the present invention are isosceles triangles as a component of the regular pentagon. In addition, all triangular shapes formed by combining any two or more of the triangular plates are isosceles triangles as a component of the regular pentagon. Furthermore, the triangular shapes formed by combining any two or more of the triangular plates have a similar shape as any one of the triangular plates. From the above, the user combines the triangular plates, and the user can experientially deepen the understanding of the figure of the regular pentagon and increase ability of geometric thinking related to the regular pentagon.

In addition to the regular pentagon, a regular decagon can be also divided into two kinds of isosceles triangles: one is an isosceles triangle having an apex angle of 108° and base angles of 36°, and the other is an isosceles triangle having an apex angle of 36° and base angles of 72°. Therefore, the figure plate set of the present invention can be useful for learning in relation to the regular decagon.

In the figure plate set of the present invention, it is preferred that a group of triangular plates including the first triangular plate and the second triangular plate are provided, and a regular pentagon or a regular decagon can be formed by combining the group of triangular plates. By the above configuration, the user combines the triangular plates to form the regular pentagon or the regular decagon. Thus, the user can experientially deepen the understanding of the figures of the regular pentagon and the regular decagon, and improve the ability of geometric thinking related to the regular pentagon and the regular decagon.

It is preferred that a plate member having a concave portion and a group of triangular plates including the first triangular plate and the second triangular plate are provided, and the group of triangular plates can be positioned so that sides or an apexes of the triangular plates are in contact with an inner peripheral wall of the concave portion. By the above configuration, the triangular plates can be positioned, and therefore the triangular plates can be combined easily. In addition, the group of the triangular plates can be kept in an assembled state. Therefore, if a storage case is added, the figure plate set can be easily carried.

It is preferred that a plate member having a circular concave portion and a group of triangular plates including the first triangular plate and the second triangular plate are provided, and a regular pentagon or a regular decagon inscribed in the circular concave portion can be formed by combining the group of triangular plates. By the above configuration, the user forms the regular pentagon or the regular decagon by placing the triangular plates on the concave portion so that apexes of the triangular plates are in contact with an inner peripheral wall of the concave portion, which forms a circumscribed circle of the regular pentagon or the regular decagon. Therefore, the user can recognize a relation between the circumscribed circle of the regular pentagon or the regular pentagon and the triangular plates. Thus, the learning effect is improved. In addition, the regular pentagon or the regular decagon formed by the triangular plates can be rotated along the concave portion. Therefore, when the user places the triangular plates, the user easily considers that the formed regular pentagon or the regular decagon is inscribed in a circle. As a result, the user can experientially understand a relation between the circumscribed circle and the regular pentagon or a relation between the circumscribed circle and the regular decagon.

Furthermore, since the concave portion has a circular shape, a clearance is formed between the sides of the placed triangular plates and the inner peripheral wall of the concave portion. Because of the clearance, the user can easily remove the placed triangular plates. Therefore, a concave portion made especially for removal is not required. In the present configuration, the triangular plates can be kept in a shape of the regular pentagon of the regular decagon by the concave portion. Therefore, if a storage case is added, for example, the figure plate set can be easily carried.

It is preferred that a plate member having a concave portion of a regular decagon and a group of triangular plates including the first triangular plate and the second triangular plate are provided, and a regular pentagon inscribed in the concave portion of the regular decagon can be formed by combining the group of triangular plates. By the above configuration, the user forms the regular pentagon by placing the triangular plates on the concave portion so that apexes of the triangular plates are in contact with an inner peripheral wall of the concave portion of the regular decagon. Therefore, the user can recognize a relation between the regular decagon and the regular pentagon that is inscribed in the regular decagon. Thus, the learning effect is improved.

It is preferred that a plate member having a concave portion and a group of triangular plates including the first triangular plate and the second triangular plate are provided, a plurality of groups of triangular plates is provided, a regular pentagon or a regular decagon can be formed by combining one of the groups of triangular plates, and the plurality of groups of triangular plates can be stored by being stacked in the concave portion. By the above configuration, the group of the triangular plates to be used can be selected. This can expand the range of learning. In addition, the triangular plates can be kept in a shape of the regular pentagon or the regular decagon by the concave portion. Therefore if a storage case is added, for example, the figure plate set can be easily carried.

It is preferred that at least one of the regular pentagon or the regular decagon inscribed in the circular concave portion is indicated on the plate member. By the above configuration, the user places the triangular plates while recognizing the indicators. Thus, the learning effect is improved.

It is preferred that an indicator indicating a similar triangle or another indicator of a regular pentagon is indicated on at least one of the first triangular plate and the second triangular plate. By the above configuration, even if one of the first triangular plate and the second triangular plate used independently, sufficient learning effect can be obtained.

It is preferred that the regular pentagon is formed as a hole having a regular pentagonal shape. By the above configuration, the regular pentagon can be easily recognized. Therefore, the learning effect is further improved. In addition, if holes having a regular pentagonal shape are provided on both of the first triangular plate and the second triangular plate, a connection means such as a clip can be inserted into the holes to keep the first triangular plate and the second triangular plate together. Therefore, the figure plate set can be easily carried.

It is preferred that another indicator indicating another similar triangle and another indicator indicating another regular pentagon are further indicated inside the regular pentagon. By the above configuration, the learning effect is further improved when one of the first triangular plate and the second triangular plate is used independently.

It is preferred that marks are indicated near apexes of the first triangular plate and the second triangular plate, and a number of the marks varies according to an angle of each of the apexes. By the above configuration, the angle can be visually recognized. Thus, the learning effect is improved.

It is preferred that at least a part of apexes of the first triangular plate and the second triangular plate is chamfered. By the above configuration, a sharp edge is not formed on the apexes. Therefore, safety can be secured when the user touches the figure plate set.

It is preferred that a plurality of figure plates included in the figure plate set is classified by color according to a kind of a triangle. By the above configuration, the user can visually deepen the understanding. In addition, when combining the triangles, the color and the angle can be considered in association with each other. Thus, the learning effect is improved.

It is preferred that at least one of a plurality of figure plates included in the figure plate set is classified by color so that a similar triangle can be recognized by the one of the plurality of figure plates. By the above configuration, the user can visually understand the figures.

By using the present invention, the user can experientially deepen the understanding of the figure about the regular pentagon when the user combines the triangular plates. Thus, ability of geometric thinking related to the regular pentagon is increased.

DETAILED DESCRIPTION OF THE INVENTION

Figure 1:
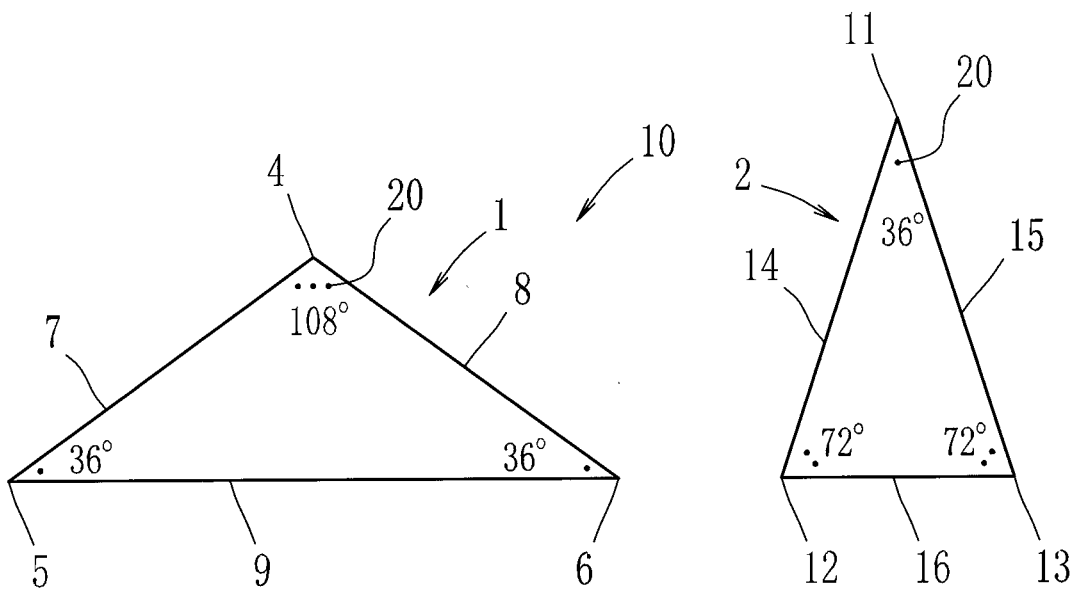
FIG. 1 is a plan view showing a figure plate set concerning the first embodiment of the present invention.

Hereafter, an embodiment of the present invention will be explained with reference to the drawings. FIG. 1 is a plan view showing a figure plate set 10 concerning the first embodiment of the present invention. The figure plate set 10 is comprised of a triangular plate 1 and a triangular plate 2. The triangular plate 1 is an isosceles triangle having an apex angle of 108° at an apex 4, and base angles of 36° at an apex 5 and an apex 6. The triangular plate 2 is an isosceles triangle having an apex angle of 36° at an apex 11, and base angles of 72° at an apex 12 and an apex 13.

On the triangular plate 1 and the triangular plate 2 of FIG. 1, angles are indicated on the apexes. In addition, marks 20 are indicated on the apexes. One of the marks 20 indicates an angle of 36°. Since the angle of the apex 4 is 108°, which is three times of 36°, three marks 20 are indicated on the apex 4. Since the marks 20 are indicated, the user can visually recognize the angles. Therefore, the user can easily recognize a sum of the angles especially when the triangular plates are combined.

As explained above, on the figure plate set for learning of the present invention, the marks are indicated near the apexes of the first triangular plate and the second triangular plate, and the number of the marks varies according to an angle of each of the apexes.

Figure 2:
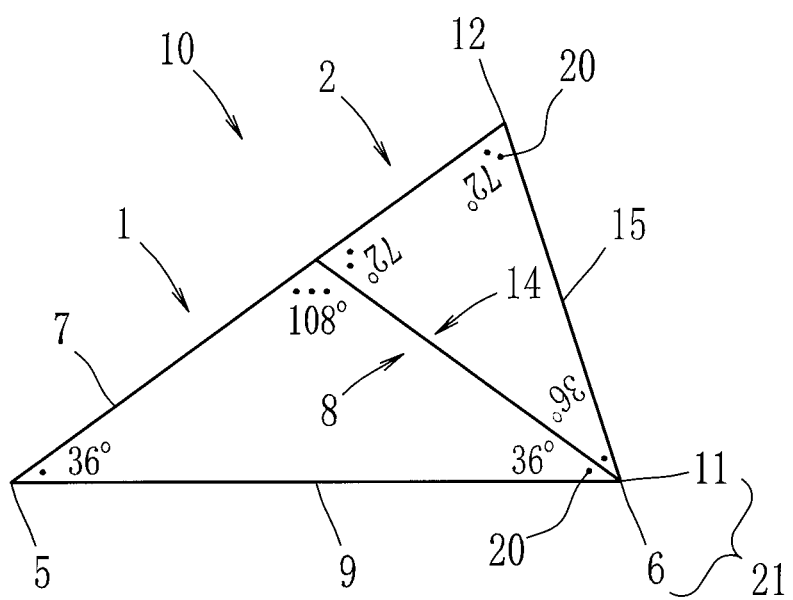
FIG. 2 is a plan view showing a state that a triangular plate 1 and a triangular plate 2 of FIG. 1 are combined.

A length of a side 7 and a side 8, which are isosceles sides of the triangular plate 1, is same as a length of a side 14 and a side 15, which are isosceles sides of the triangular plate 2. From the above, if the triangular plate 1 and the triangular plate 2 are combined, a new triangle can be formed. FIG. 2 shows a state that a new triangle is formed by combining the triangular plate 1 and the triangular plate 2 of FIG. 1 so that the side 8 of the triangular plate 1 and the side 14 of the triangular plate 2 are aligned.

Figure 3:
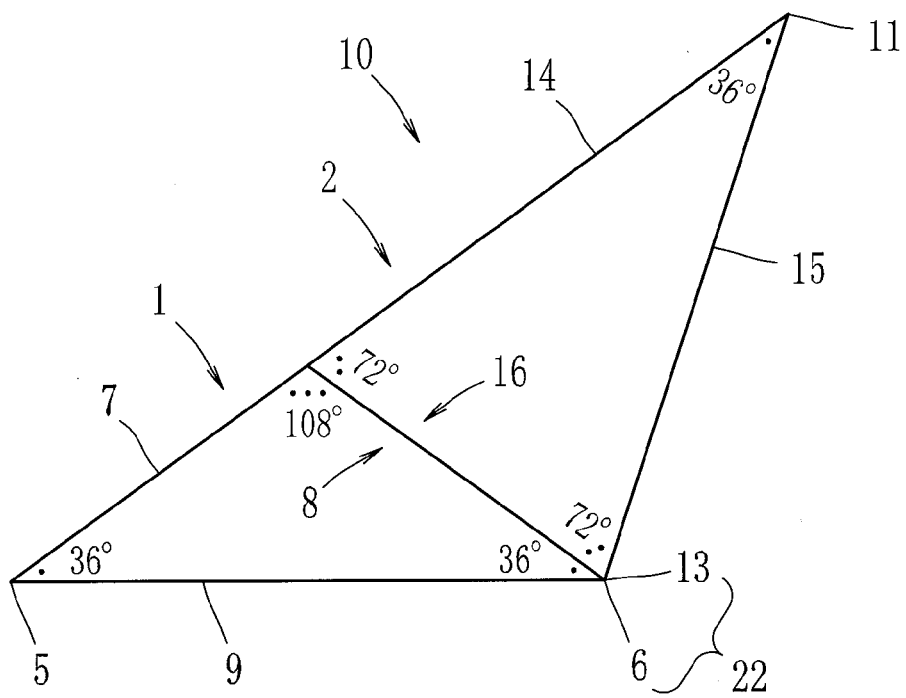
FIG. 3 is a plan view showing another example of the figure plate set concerning the first embodiment of the present invention.

FIG. 3 shows another example of the figure plate set 10. In the figure plate set 10 shown in FIG. 3, a length of the side 7 and the side 8, which are isosceles sides of the triangular plate 1, is same as a length of a side 16, which is a bottom side of the triangular plate 2. From the above, a new triangle can be formed by combining the triangular plate and the triangular plate 2 so that the side 8 of the triangular plate 1 is aligned with the side 16 of the triangular plate 2, as shown in FIG. 3.

As explained above, the figure plate set for learning of the present invention is comprised of a first triangular plate that has an isosceles triangular shape having an apex angle of 108° and base angles of 36°, and a second triangular plate that has an isosceles triangular shape having an apex angle of 36° and base angles of 72°, wherein a length of isosceles sides of the first triangular plate is same as a length of isosceles sides or a bottom side of the second triangular plate, and a new triangular shape can be formed by combining the first triangular plate and the second triangular plate.

Figure 4:
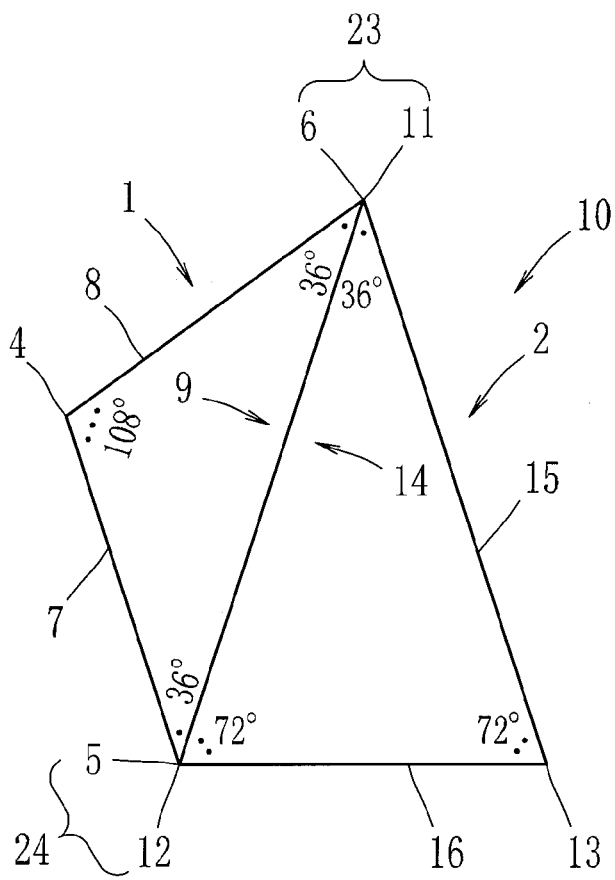
FIG. 4 is a plan view showing another combination of the triangular plate 1 and the triangular plate 2 of FIG. 3.
Figure 7:
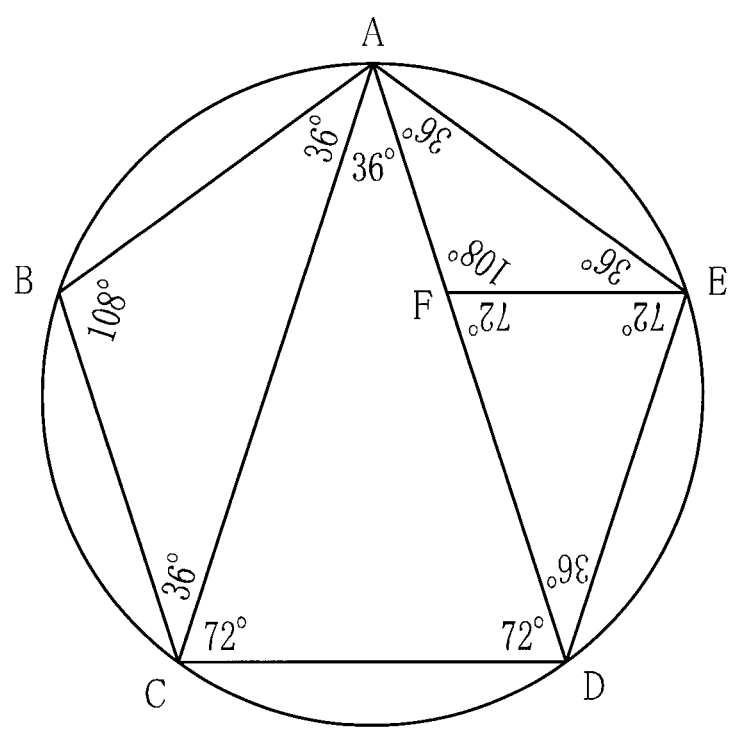
FIG. 7 is a diagram explaining characteristics of the figure of a regular pentagon.
Figure 11:
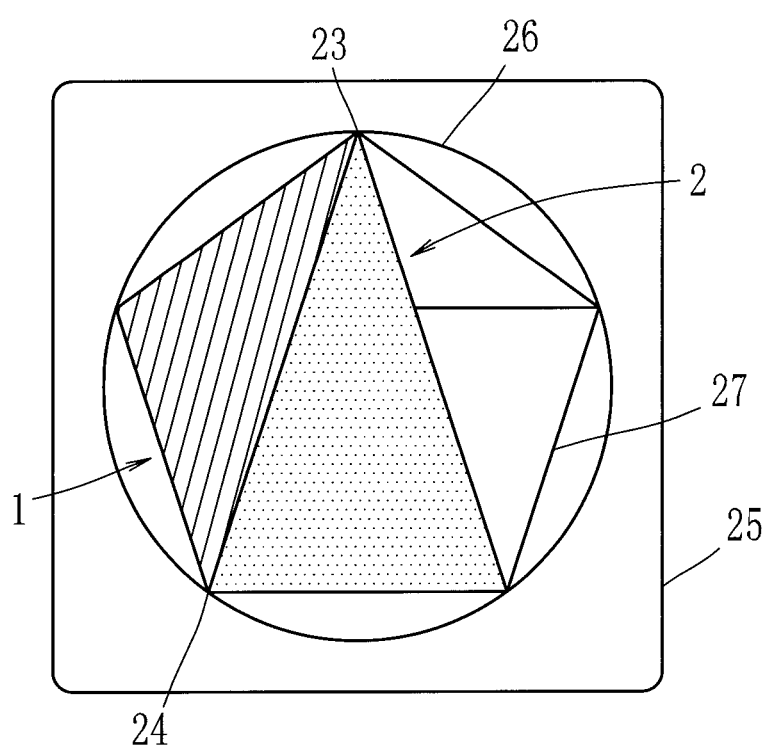
FIG. 11 is a plan view showing a state that the triangular plate 1 and the triangular plate 2 are placed on the concave portion of the plate member 25 of FIG. 8, as a third example.

The combined triangle shown in FIG. 3 is an isosceles triangle having an apex angle of 108°, which is a sum of 36° and 72°, at an apex 22. Therefore, the length of the side 14 and the side 15 is same as the length of a side 9. Thus, as shown in FIG. 4, a quadrangle can be formed by aligning the side 14 of triangular plate 2 with the side 9 of triangular plate 1. As explained later, the quadrangle formed here is related to the regular pentagon, as shown in FIGS. 7 and 11.

Figure 5:
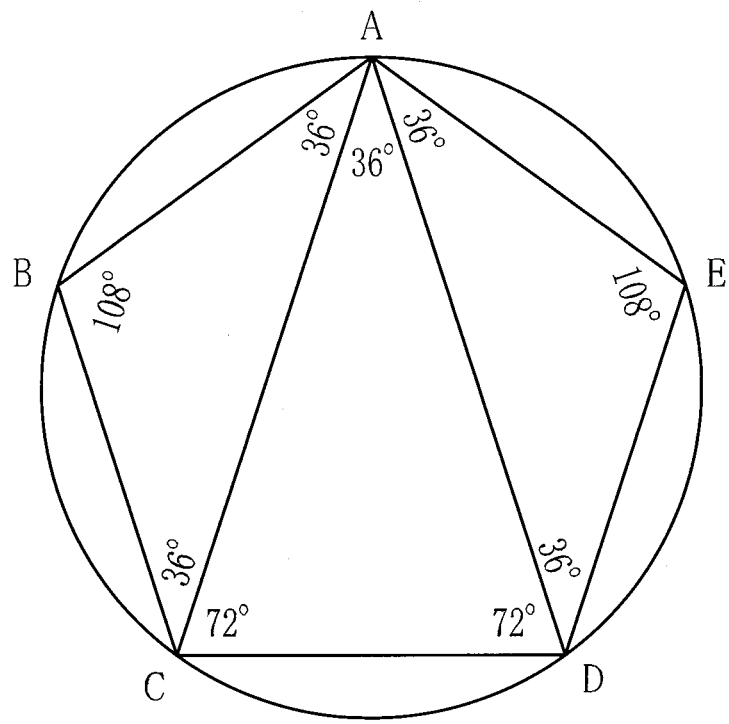
FIG. 5 is a diagram explaining characteristics of the figure of a regular pentagon.
Figure 6:
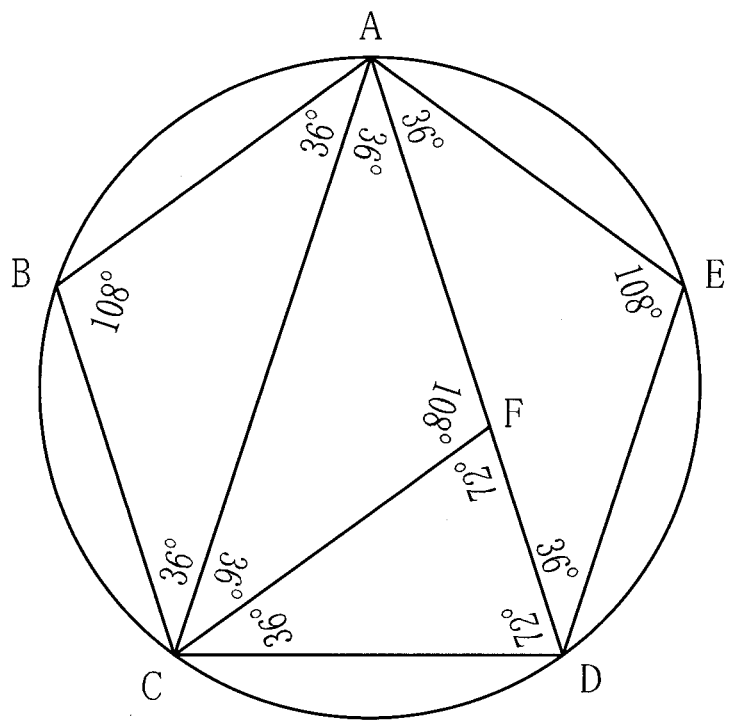
FIG. 6 is a diagram explaining characteristics of the figure of a regular pentagon.

The inventor of the present invention found that the ability of geometric thinking related to the regular pentagon could be increased by using the figure plate set 10 shown in FIGS. 1 to 4. This will be explained with reference to FIGS. 5 to 7. FIGS. 5 to 7 are diagrams explaining characteristics of the figure of the regular pentagon.

In FIG. 5, the regular pentagon is divided into three triangles by adding a line AC and a line AD into the regular pentagon. By referring to the figure, the regular pentagon can be divided into two kinds of isosceles triangles: one is an isosceles triangle BCA and an isosceles triangle EAD, both having an apex angle of 108° and base angles of 36°, and the other is an isosceles triangle ACD having an apex angle of 36° and base angles of 72°.

FIG. 6 is a diagram formed by adding a line CF into the diagram of FIG. 5. By adding the line CF, the isosceles triangle ACD is divided into an isosceles triangle FAC having an apex angle of 108° and base angles of 36°, and an isosceles triangle CDF having an apex angle of 36° and base angles of 72°. The isosceles triangle FAC, which is one of the triangles obtained by being divided, is a congruent triangle of the isosceles triangle BCA. The isosceles triangle CDF, which is the other of the triangles obtained by being divided, is a similar triangle of the isosceles triangle ACD, which is a triangle before being divided.

FIG. 7 is a diagram formed by adding a line EF into the diagram of FIG. 5. By adding the line EF, the isosceles triangle EAD is divided into an isosceles triangle FEA having an apex angle of 108° and base angles of 36°, and an isosceles triangle DEF having an apex angle of 36° and base angles of 72°. The isosceles triangle FEA, which is one of the triangles obtained by being divided, is a similar triangle of the isosceles triangle EAD, which is a triangle before being divided. The isosceles triangle DEF, which is the other of the triangles obtained by being divided, is a similar triangle of the isosceles triangle ACD.

As shown in FIGS. 5 to 7, the regular pentagon can be regarded as an assembly of two kinds of isosceles triangles: one is an isosceles triangle having an apex angle of 108° and base angles of 36°, and the other is an isosceles triangle having an apex angle of 36° and base angles of 72°. The dividing lines shown in FIGS. 6 and 7 are merely an example. If the divided lines are further added, isosceles triangles having a congruent shape or a similar shape as the isosceles triangles shown in FIGS. 5 to 7 can be further added. In addition, the user can realize that an inner angle of 108° is formed by a sum of three 36° at some apexes, and an inner angle of 108° is formed by a sum of 36° and 72° at the other apexes.

Therefore, the user can realize that the regular pentagon is geometrically related to two kinds of isosceles triangles: one is an isosceles triangle having an apex angle of 108° and base angles of 36°, and the other is an isosceles triangle having an apex angle of 36° and base angles of 72°. From the above, if two kinds of isosceles triangles, which are components of the regular pentagon as explained above, are prepared as a set of the triangular plates, the user can combine the triangular plates and experientially deepen the understanding of the figure of the regular pentagon. Thus, the ability of geometric thinking related to the regular pentagon can be increased.

As explained above, the figure plate set for learning of the present invention is comprised of a group of triangular plates that includes the first triangular plate and the second triangular plate, and the regular pentagon or the regular decagon can be formed by combining the triangular plates included in the group of triangular plates.

The figure plate set 10 concerning the present embodiment is derived from the above described viewpoint. For example, the combined triangle shown in FIG. 2 corresponds to the isosceles triangle ACD, which is formed by combining the isosceles triangle FAC and the isosceles triangle CDF shown in the regular pentagon of FIG. 6. The combined triangle shown in FIG. 3 corresponds to the isosceles triangle EAD, which is formed by combining the isosceles triangle FEA and the isosceles triangle DEF shown in the regular pentagon of FIG. 7. The combined polygon shown in FIG. 4 corresponds to the quadrangle, which is formed by combining the isosceles triangle BCA and the isosceles triangle ACD shown in the regular pentagon of FIG. 5.

In order to make learning efficiency using the figure plate set 10, a guide indicating a method of using the figure plate set 10 should be prepared in advance. Information useful for geometric thinking using the triangular plate 1 and the triangular plate 2 should be written in the guide. For example, a relation between the triangular plate 1 or the triangular plate 2 and the regular pentagon, and a relation between the angles of the apexes of the triangular plate 1 or the triangular plate 2 and the inner angle of the regular pentagon can be written. Similarly, a similarity relation between the newly formed triangle, which is formed by combining the triangular plate 1 and the triangular plate 2, and the triangular plate 1 or the triangular plate 2 can be written, for example.

If the above described guide is used simultaneously, the user can recognize that the triangular plate 1 and the triangular plate 2 are the components of the regular pentagon, and the user can experientially understand a relation between the angles of 36°, 72° or 108° and the regular pentagon. Similarly, the user can experientially understand a relation between the inner angle 108° of the regular pentagon and the angles of 36°, 72° or 108° by combining the triangular plate 1 and the triangular plate 2.

Furthermore, the user can experientially understand a similarity relation between the newly formed triangle, which is formed by combining the triangular plate 1 and the triangular plate 2, and the triangular plate 1 or the triangular plate 2. Thus, the user can increase the ability of geometric thinking related to the regular pentagon. For example, as explained later using FIG. 17, a quadratic equation can be formed based on the understanding of the similarity relation. Thus, lengths of the sides of the newly formed triangle, which is formed by combining the triangular plate 1 and the triangular plate 2, can be calculated.

Although the relation between the triangular plate 1 or the triangular plate 2 and the regular pentagon is explained in the above embodiment, the regular decagon can be also formed by combining the triangular plate 1 and the triangular plate 2. Therefore, if the triangular plate 1 and the triangular plate 2 are regarded as components of the regular decagon, the learning related to the regular decagon is enabled by using the triangular plate 1 and the triangular plate 2. This learning will be explained later using FIG. 18.

The triangular plate 1 and the triangular plate 2 can be easily turned over because they are plate-like members. From the above, fixed thinking about the shape of the triangle is prevented and flexible thinking is enabled. The figure plate set 10 can be rotated on a plane. This also helps the flexible thinking.

Hereafter, an example of learning using the figure plate set 10 will be explained. The combined triangle shown in FIG. 2 is formed by a combination of the triangular plate 1 and the triangular plate 2. Since the angles are indicated on the triangular plate 1 and the triangular plate 2, the user can understand that an angle of the combined triangle at an apex 21 is 72°, which is a sum of 36° and 36°. In addition, the user can understand that the combined triangle is an isosceles triangle having an apex angle of 36° and base angles of 72°. In other words, the user can understand that the combined triangle is a similar triangle of the triangular plate 2. Namely, the user can experientially understand characteristics of the figure about the triangle having angles of 36°, 72° and 108° by combining the triangular plate 1 and the triangular plate 2. In addition, as explained above, the triangle having angles of 36°, 72° and 108° is geometrically related to the regular pentagon. Therefore, the understanding obtained by combining the figure plates can also help the user to understand characteristics of the regular pentagon.

In the above embodiment, the explanation is made by using an example of the figure plate set 10 shown in FIG. 2. However, even if the figure plate set 10 shown in FIG. 3 is used, same effect of learning can be obtained. In particular, as shown in FIG. 4, a quadrangle can be formed by combining the figure plate set 10 of FIG. 3. As described above, the quadrangle shown in FIG. 4 corresponds to a quadrangle ABCD shown in FIG. 7, and the quadrangle is geometrically related to the regular pentagon. Therefore, the learning effect can be obtained by using two kinds of combinations shown in FIGS. 3 and 4.

On the figure plate set 10, as shown in FIG. 1, the marks 20 are indicated near the apexes, and a number of the marks varies according to an angle of each of the apexes. One of the marks 20 corresponds to an angle of 36°. Since the marks 20 are indicated, the user can visually recognize the angles. Thus, the learning effect is improved. The angle of 108° is an inner angle of the regular pentagon, and is three times of the angle of 36°. The angles of the apexes of the triangular plate 1 and the triangular plate 2 are 36°, 72° (two times of 36°) or 108° (three times of 36°, and the inner angle of the regular pentagon). Namely, the angles of the apexes are 36° or a multiple of 36°. From the above, one of the marks 20 is specified to correspond to the angle of 36°. Since the marks 20 are indicated, the user can visually recognize the angles of the apexes in association with the angle of 36°. Thus, the learning effect is improved.

For example, on the combined triangle shown in FIG. 2, a new apex 21 is formed by a combination of the apex 6 and the apex 11. Since two marks 20 are indicated near the apex 21, the user can visually recognize that the angle of the apex 21 is two times of 36°, namely 72°. In FIG. 2, the user can easily recognize that the number of the marks 20 at the apex 21 or the apex 12 is two, and the number of the marks 20 at the apex 5 is one. Therefore, the user can visually recognize that the combined triangle shown in FIG. 2 is an isosceles triangle having an apex angle of 36° and base angles of 72°.

Figure 8:
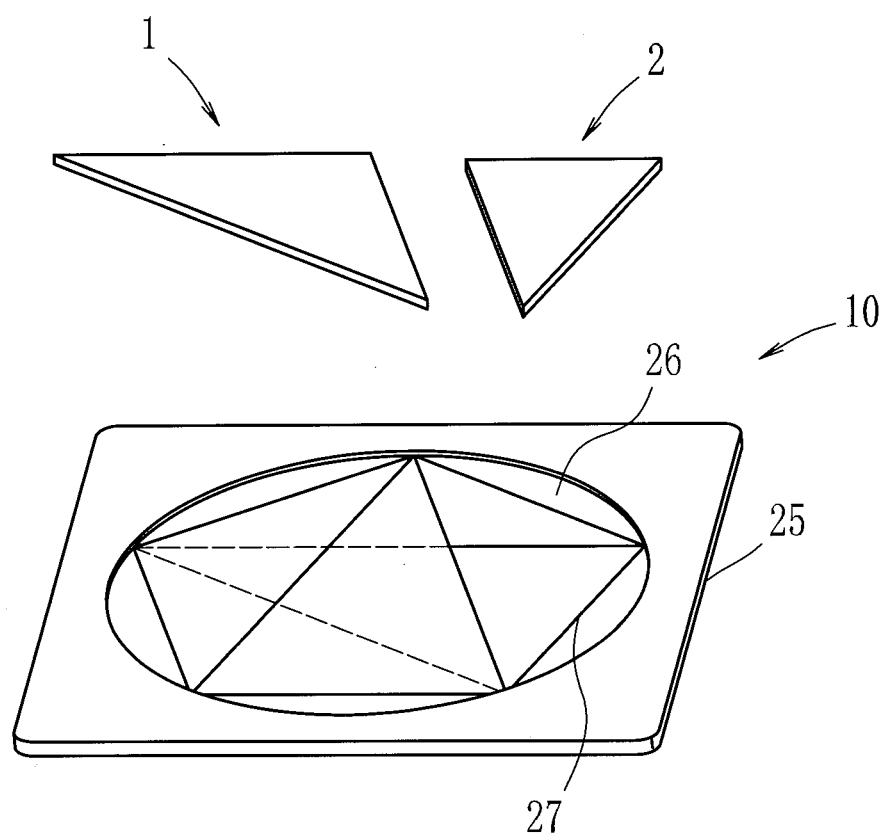
FIG. 8 is an exploded perspective view showing the figure plate set concerning the second embodiment of the present invention.

In order to increase the learning effect, a plate member used for placing the triangular plate 1 and the triangular plate 2 should be used simultaneously with the triangular plate 1 and the triangular plate 2. FIG. 8 is an exploded perspective view showing the figure plate set concerning the second embodiment of the present invention. The figure plate set 10 shown in FIG. 8 includes a plate member 25, in addition to the triangular plate 1 and the triangular plate 2. A concave portion 26 having a circular shape is formed on the plate member 25. On a bottom surface of the concave portion 26, indicators 27 are indicated. The indicators 27 include a regular pentagon inscribed in a circumference of the concave portion 26 and various triangles. Therefore, the user can place the triangular plate 1 and the triangular plate 2 while recognizing the indicators 27. Thus, the learning effect is improved. Note that a regular decagon inscribed in a circumference of the concave portion 26 can be also indicated on the bottom surface of the concave portion 26.

As explained above, the figure plate set for learning of the present invention is comprised of a plate member having a circular concave portion, and a group of triangular plates including the first triangular plate and the second triangular plate, wherein a regular pentagon or a regular decagon inscribed in the circular concave portion can be formed by combining the triangular plates included in the group of triangular plates. In addition, at least one of the regular pentagon or the regular decagon inscribed in the circular concave portion is indicated on the plate member.

Hereafter, the explanation will be done by using an example of the concave portion 26 having a circular shape. However, the shape of the concave portion 26 is not limited to the circular shape as long as the triangular plates can be placed on the concave portion 26. For example, the concave portion 26 can be a regular pentagon or a regular decagon. Regarding this point, the explanation will be done later using FIG. 20. In addition, the angles and the marks 20 can be indicated on the triangular plates similar to FIGS. 1 to 4.

If the concave portion 26 is formed to the regular decagon, the figure plate set for learning of the present invention is comprised of a plate member that has a concave portion having a regular decagonal shape, and a group of triangular plates including the first triangular plate and the second triangular plate, wherein a regular pentagon inscribed in the concave portion having the regular decagonal shape can be formed by combining the triangular plates included in the group of triangular plates.

Figure 9:
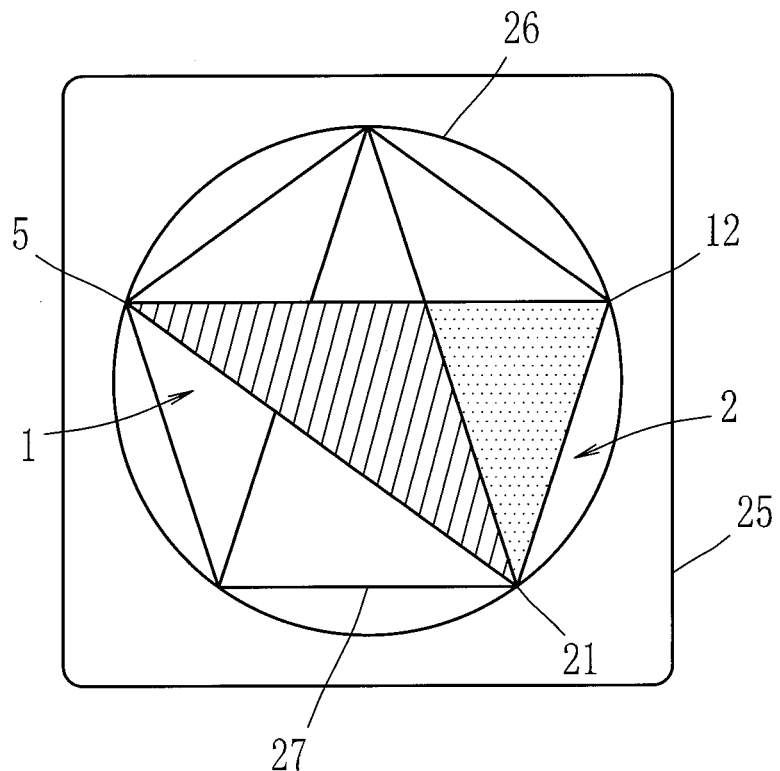
FIG. 9 is a plan view showing a state that the triangular plate 1 and the triangular plate 2 are placed on a concave portion of a plate member 25 of FIG. 8, as a first example.

FIG. 9 is a plan view showing a state that the triangular plate 1 and the triangular plate 2 are placed on the concave portion 26 of the plate member 25. The triangular plate 1 and the triangular plate 2 correspond to the triangular plates shown in FIGS. 1 and 2. For convenience of explanation in the figure, slashed lines are added to the triangular plate 1 and dots are added to the triangular plate 2. This is also applied to FIGS. 10, 11, 13 and 18.

As explained above, the figure plate set for learning of the present invention is comprised of a plate member having a concave portion, and a group of triangular plates including the first triangular plate and the second triangular plate, wherein the triangular plates included in the group of triangular plates can be positioned so that sides or apexes of the triangular plates are in contact with an inner peripheral wall of the concave portion.

Figure 14:
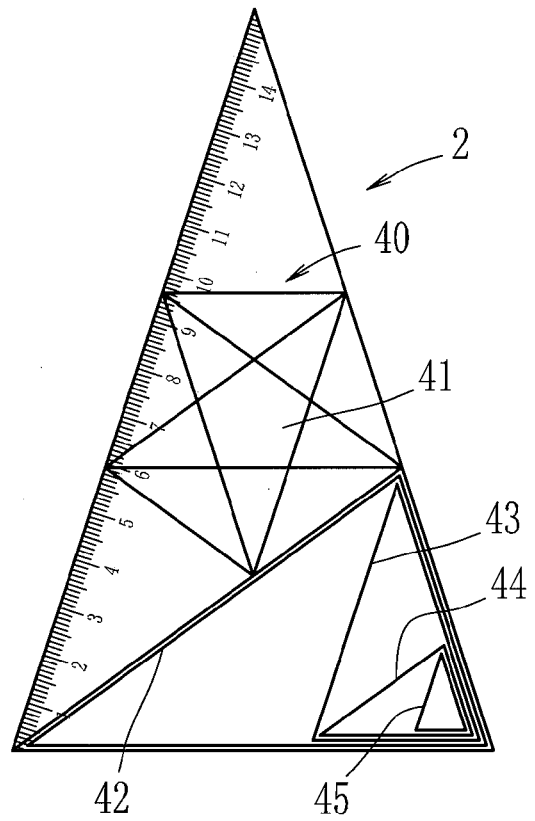
FIG. 14 is a plan view showing an example of the triangular plate on which various indicators are added in an embodiment of the present invention.
Figure 15:
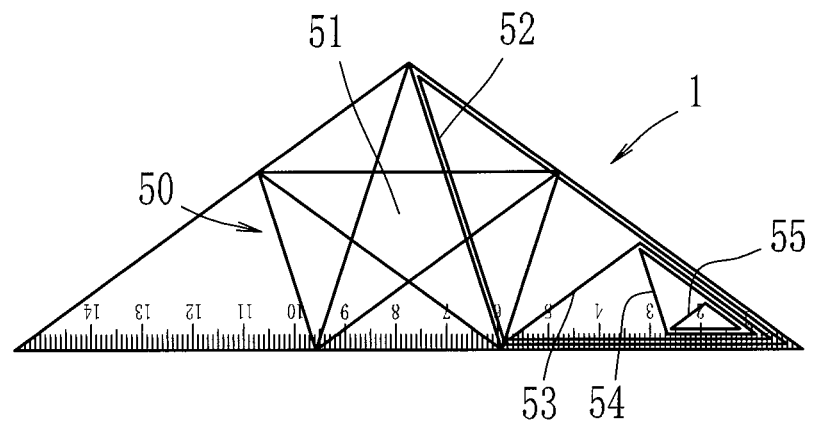
FIG. 15 is a plan view showing another example of the triangular plate on which various indicators are added in an embodiment of the present invention.
Figure 16:
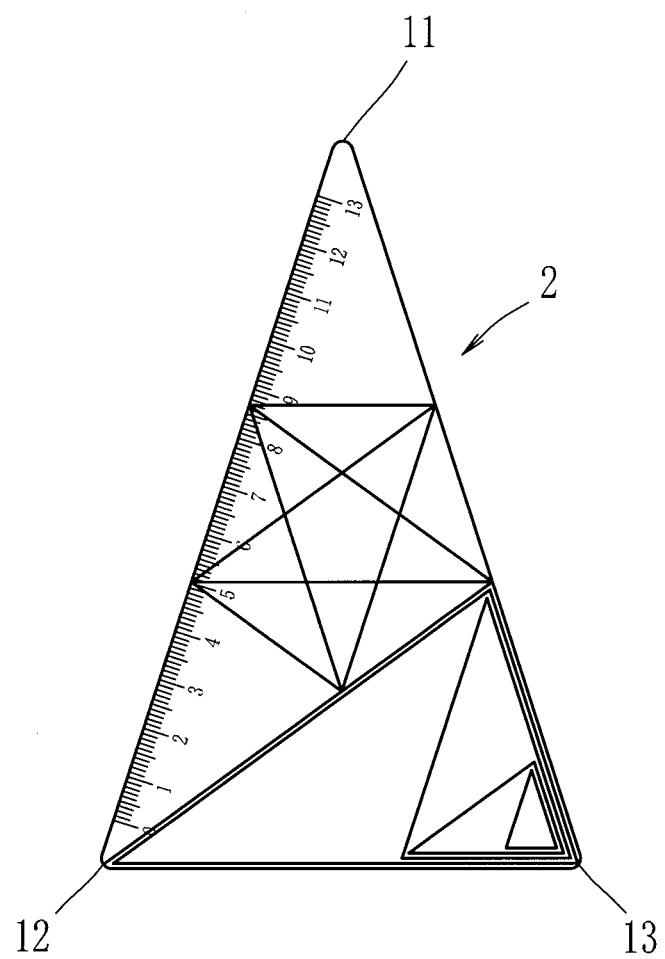
FIG. 16 is a plan view showing an example in which apexes of the triangular plate of FIG. 14 are chamfered.

The triangular plate 1 and the triangular plate 2 can be classified by color so that the triangular plate 1 and the triangular plate 2 can be distinguished with each other. By the above configuration, the user can visually deepen the understanding. In addition, when the triangular plate 1 and the triangular plate 2 are combined, the color and the angle can be considered in association with each other. Thus, the learning effect is improved. The figure plates included in the triangular plate 1 or the triangular plate 2 can be classified by color so that similar triangles can be recognized. Thus, the learning effect is improved. This configuration is effective especially when the indicator indicating a similar triangle is indicated on the triangular plate 1 or the triangular plate 2 as shown in FIGS. 14 to 16 explained later.

The color can be classified into colored and colorless (transparent). The classification by color is also effective when using three or more triangular plates shown in FIGS. 12 to 13 and FIGS. 18 to 19 explained later. In this case, the triangular plates can be classified by color according to a kind of a triangle. For example, the triangular plates are classified into either of two triangles: one is the triangle similar to the triangular plate 1 shown in FIG. 1, and the other is the triangle similar to the triangular plate 2 shown in FIG. 2.

As explained above, in the figure plate set for learning of the present invention, a plurality of the triangular plates included in the figure plate set are classified by color according to a kind of a triangle. In this case, at least one of the plurality of triangular plates may be classified by color so that the similar triangle can be recognized from the triangular plates.

In FIG. 8, since the concave portion 26 has a circular shape, an inner peripheral wall is formed in a circular shape on the concave portion 26. In FIG. 9, the apex 5, the apex 12 and the apex 21 of the triangle formed by the triangular plate 1 and the triangular plate 2 are in point-contact with the inner peripheral wall of the concave portion 26. By the above configuration, the triangular plate 1 and the triangular plate 2 are placed on the concave portion 26 so that the apexes of the triangular plate 1 and the triangular plate 2 are in contact with the inner peripheral wall of the concave portion 26. Here, the inner peripheral wall of the concave portion 26 forms a circumscribed circle of the regular pentagon. Therefore, the user can recognize a relation between the circumscribed circle of the regular pentagon or the regular pentagon and the triangular plate 1 or the triangular plate 2 through the above described placement work. Thus, the learning effect is improved.

Figure 10:
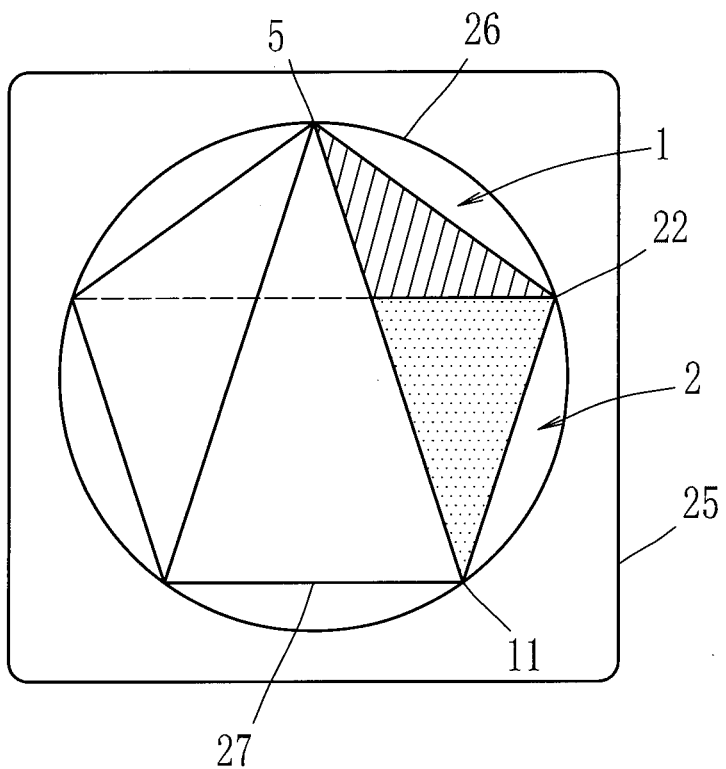
FIG. 10 is a plan view showing a state that the triangular plate 1 and the triangular plate 2 are placed on the concave portion of the plate member 25 of FIG. 8, as a second example.

FIG. 10 is a plan view showing a state that the triangular plate 1 and the triangular plate 2 are placed on the concave portion 26 of the plate member 25, as another example. A newly formed triangle formed by the triangular plate 1 and the triangular plate 2 corresponds to the triangle shown in FIG. 3. FIG. 11 is a plan view showing a state that the triangular plate 1 and the triangular plate 2 are placed on the concave portion 26 of the plate member 25, as another example. In FIG. 11, a quadrangle formed by the triangular plate 1 and the triangular plate 2 corresponds to the quadrangle shown in FIG. 4. Also in the configurations of FIG. 10 and FIG. 11, same as the configuration of FIG. 9, the user can recognize a relation between the circumscribed circle of the regular pentagon or the regular pentagon and the triangular plate 1 or the triangular plate 2 through the above described placement work. Thus, the learning effect is improved.

If a total of four triangular plates are prepared by using the triangular plate 1 and the triangular plate 2 shown in FIG. 11 and the triangular plate 1 and the triangular plate 2 shown in FIG. 10, a regular pentagon can be formed by combining the four triangular plates. The figure plate set 10 shown in FIG. 12 includes a group of triangular plates 30 formed by four triangular plates 31 to 34. A regular pentagon can be formed by the four triangular plates 31 to 34. The figure plate set 10 shown in FIG. 12 includes a plate member 25, which is same as the plate member 25 shown in FIG. 8. The triangular plates 31 to 34 can be placed on the plate member 25.

Figure 13:
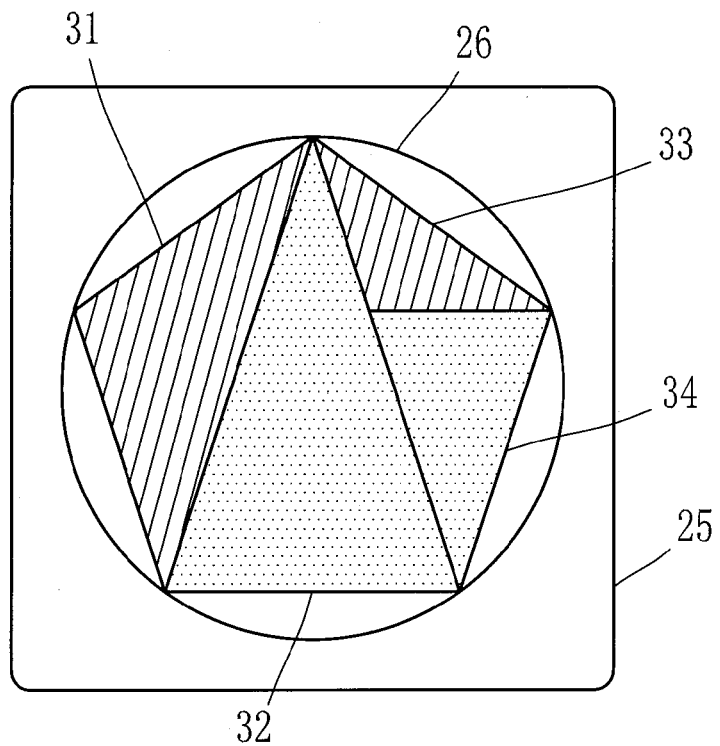
FIG. 13 is a plan view showing a state that a group of triangular plates 30 is placed on the concave portion of the plate member 25 of FIG. 12.

FIG. 13 is a plan view showing a state that the triangular plates 31 to 34 are placed on the plate member 25. Since the concave portion 26 has a circular shape, the apexes of the triangular plates 31 to 34 are in point-contact with the inner peripheral wall of the concave portion 26 in a state of FIG. 13. By the above configuration, the user completes the regular pentagon by placing the triangular plates 31 to 34 on the concave portion 26 so that the apexes of the triangular plates 31 to 34 are in contact with the inner peripheral wall of the concave portion 26. Here, the inner peripheral wall of the concave portion 26 forms the circumscribed circle of the regular pentagon. Therefore, the user can recognize a relation between the circumscribed circle of the regular pentagon and the triangular plates 31 to 34 and a relation between the regular pentagon and the triangular plates 31 to 34 through the above described placement work. Thus, the learning effect is improved.

In the regular pentagon formed by the triangular plates 31 to 34 shown in FIG. 13, the sides of the triangular plates 31 to 34 are not in contact with the inner peripheral wall of the concave portion 26 because the concave portion 26 has a circular shape. Therefore, the apexes of the triangular plates 31 to 34 are in contact with the inner peripheral wall of the concave portion 26. In the concave portion 26, the regular pentagon formed by the triangular plates 31 to 34 are not completely fixed in position and can be rotated along the concave portion 26. Therefore, the user easily recognizes that the regular pentagon inscribed in a circle is formed when the user places the triangular plates 31 to 34. Thus, the user can experientially realize a relation between the circumscribed circle and the regular pentagon.

Since the concave portion 26 has a circular shape, a clearance is formed between the sides of the placed triangular plates 31 to 34 and the inner peripheral wall of the concave portion 26. Because of the clearance, the placed triangular plates 31 to 34 can be easily removed, and a concave portion made especially for removal is not required.

In a state of FIG. 13, the apexes of the regular pentagon formed by the triangular plates 31 to 34 are positioned on the inner peripheral wall of the concave portion 26. Thus, the triangular plates 31 to 34 are kept by the concave portion 26. In the state of FIG. 13, the figure plate set 10 is organized and assembled. Therefore, if a storage case is added, for example, the figure plate set 10 can be easily carried.

Figure 12:
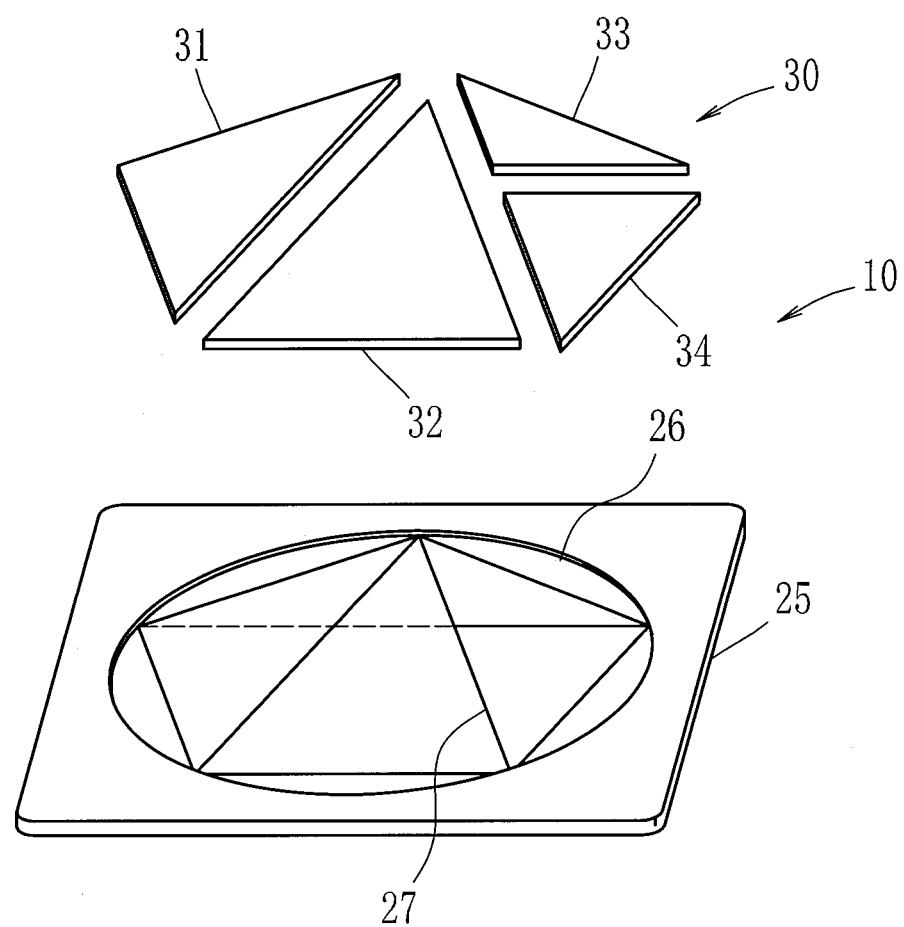
FIG. 12 is an exploded perspective view showing a second example of the figure plate set concerning the second embodiment of the present invention.

When the group of triangular plates is formed by three or more of the triangular plates as shown in an example of FIG. 12, at least one pair of triangular plates shown in FIGS. 2 and 3 should be included. As for other triangular plates, the pair of triangular plates shown in FIGS. 2 and 3 does not have to be necessarily used. Also, the triangular plates having the angles shown in FIG. 1 do not have to be necessarily used. For example, in FIG. 12, the triangular plate 33 and the triangular plate 34 can be formed with each other. In addition, the triangular plate 31 and the triangular plate 32 can be further divided into smaller plates. In this case, the divided triangle does not have to have the same angles as the triangular plate shown in FIG. 1.

In the above described various examples, the triangular plates included in the figure plate set 10 are combined. However, the triangular plate can be independently used. Even if the triangular plate is independently used, sufficient learning effect can be obtained by adding various indicators to the triangular plate. FIG. 14 shows an example of the triangular plate 2 on which various indicators are added. An indicator 40 has an outer shape of regular pentagon. In addition, lines are added to connect the apexes of the regular pentagon. From the above, in the regular pentagon, the user can recognize similar triangles that are similar with the triangle of the triangular plate 2. In addition, the user can also recognize similar triangles that are similar with the triangular plate 1 shown in FIG. 1. Furthermore, the user can also recognize another regular pentagon 41 in the regular pentagon.

As explained above, in the figure plate set for learning of the present invention, an indicator indicating a similar triangle or another indicator of a regular pentagon is indicated on at least one of the first triangular plate and the second triangular plate. Furthermore, another indicator indicating another similar triangle and another indicator of another regular pentagon are further indicated in the regular pentagon.

Indicators 42 to 45 are similar triangles that are similar with the triangular plate 2. The indicator 43 is added in the indicator 42. The indicator 44 is added in the indicator 43. The indicator 45 is added in the indicator 44. From the above, the user can sequentially recognize the similar triangles from a larger to a smaller size. In addition, the user can also recognize the similar triangle that is similar with the triangular plate 1 shown in FIG. 1.

Therefore, by using the triangular plate 2 shown in FIG. 14, the user can refer to the indicators 40 and 42 to 45 of the triangular plate 2. Thus, the learning using only the triangular plate 2 can be enabled. Although both the indicator 40 and the indicators 42 to 45 are indicated in FIG. 14, one of them can be omitted. In addition, a scale can be omitted.

FIG. 15 shows an example the triangular plate 1 on which various indicators is added. An indicator 50 is same as the indicator 40 shown in FIG. 14. Indicators 52 to 55 are same as the indicators 42 to 45 shown in FIG. 14. Same as the triangular plate 2 shown in FIG. 14, by using the triangular plate 1 shown in FIG. 15, the user can refer to the indicators 50 and 52 to 55 of the triangular plate 1. Thus, the learning using only the triangular plate 1 can be enabled. Same as the triangular plate 2 shown in FIG. 14, one of the indicator 50 and the indicators 52 to 55 can be omitted, and a scale can be omitted.

The regular pentagon 41 shown in FIG. 14 and the regular pentagon 51 shown in FIG. 15 can be formed as a hole. By the above configuration, the user can easily recognize the regular pentagon. Thus, the learning effect is further improved. If the figure plate set is formed by the triangular plate 2 shown in FIG. 14 and the triangular plate 1 shown in FIG. 15, the hole of the regular pentagon 41 and the hole of the regular pentagon 51 can be overlapped. Then, if a connection means such as a clip is inserted into the overlapped holes, the first triangular plate and the second triangular plate can be kept together. By the above configuration, the figure plate set can be easily carried.

As explained above, in the figure plate set for learning of the present invention, the regular pentagon is formed as a hole having a regular pentagonal shape.

FIG. 16 shows another embodiment of the triangular plate. In the triangular plate 2 shown in FIG. 16, the apexes 11 to 13 of the triangular plate 2 shown in FIG. 14 are chamfered. The "chamfered" in the present embodiment means that the apexes (i.e. corners) are rounded. By the above configuration, a sharp edge is not formed on the apexes 11 to 13. Therefore, safety can be secured when the user touches the figure plate set. In the above embodiment, the explanation is made by using an example of the triangular plate 2 shown in FIG. 14. However, all the triangular plates included in the figure plate set can be chamfered. Although all of three apexes can be chamfered, only the apex having an angle of 36°, which is the sharpest angle, can be chamfered.

As explained above, in the figure plate set for learning of the present invention, at least a part of apexes of the first triangular plate and the second triangular plate is chamfered.

Figure 17:
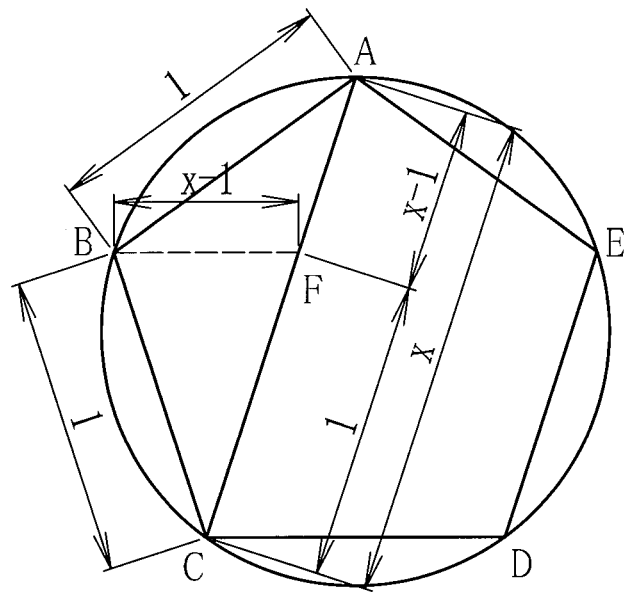
FIG. 17 is a diagram showing an example of an exercise of geometric thinking about a regular pentagon.

FIG. 17 is a diagram showing an example of an exercise of geometric thinking about the regular pentagon. A length of one side of the regular pentagon shown in FIG. 17 is 1. The example of the exercise is calculating a length x of a diagonal line AC through the geometric thinking. From given conditions, it can be directly derived that a length of a side AB and a side BC is 1 and an angle at an apex B is 108°, which is an inner angle of the regular pentagon. Therefore, the example of the exercise is same as calculating a length of a bottom side AC of an isosceles triangle BCA having an apex angle of 108°.

The example of the exercise cannot be solved unless the user thinks of making a similar triangle that is similar with the isosceles triangle BCA in the isosceles triangle BCA. Namely, by drawing an auxiliary line BF, the isosceles triangle BCA is divided into two and a triangle FAB is formed. The auxiliary line BF is a part of a line that connects an apex B and an apex E of the regular pentagon. The isosceles triangle BCA corresponds to a newly formed triangle formed by combining the triangular plate 1 and the triangular plate 2 shown in FIG. 10. The triangle FAB corresponds to a triangle of the triangular plate 1 shown in FIG. 10.

Therefore, if the user experientially understands the similarity relation between the combined triangle and an independent triangle that forms the combined triangle by using the figure plate set 10 of the present embodiment, the user can think of drawing the auxiliary line BF in FIG. 17 because the user knows that a perpendicular line is formed in FIG. 10 by combining the triangular plate 1 and the triangular plate 2. In other words, the learning effect of the figure plate set 10 is expected in the example of the exercise that requires the geometric thinking related to the regular pentagon shown in FIG. 17. If the user draws the auxiliary line BF and thinks of that the isosceles triangle BAC is similar with the triangle FAB, a quadratic equation can be formed about a length ratio of sides of both triangles. Then, the length of the diagonal line AC can be calculated by solving the quadratic equation.

Figure 18:
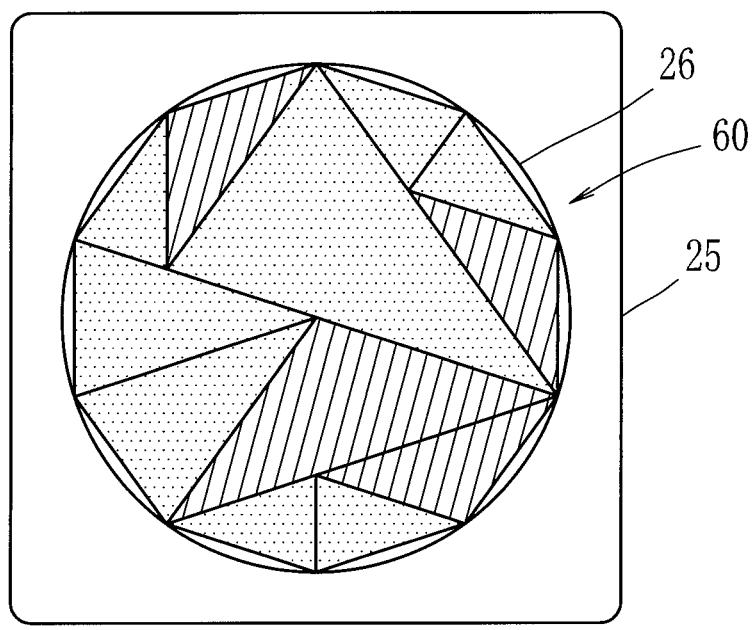
FIG. 18 is a plan view showing an example in which the number of the triangular plates included in the figure plate set is increased in the second embodiment of the present invention.

FIG. 18 shows an example in which the number of the triangular plates included in the figure plate set is increased. A group of triangular plates 60 is comprised of twelve triangular plates. The triangular plates are classified into two kinds: one is a triangular plate (shaded part) similar with the triangular plate 1 shown in FIG. 1, and the other is a triangular plate (dotted part) similar with the triangular plate 2 shown in FIG. 2. Since the number of the triangular plates is increased, the number of the apexes is increased compared to the regular pentagon and the regular decagon is formed in FIG. 18. From the above, the range of learning using the figure plate set can be expanded.

In other words, although the user can easily imagine that the regular decagon is formed by using ten triangular plates 2, the user can hardly imagine that the regular decagon is formed by combining the triangular plate 1 and the triangular plate 2. By using the figure plate set shown in FIG. 18, the user can experientially understand that the angles of 72°, 108° and 144° are included in the regular decagon. Here, the angles of 72°, 108° and 144° are multiples of the angle of 36°. Furthermore, the user can experientially understand that the multiples of the angle are formed by combining the triangular plate 1 and the triangular plate 2.

Figure 19:
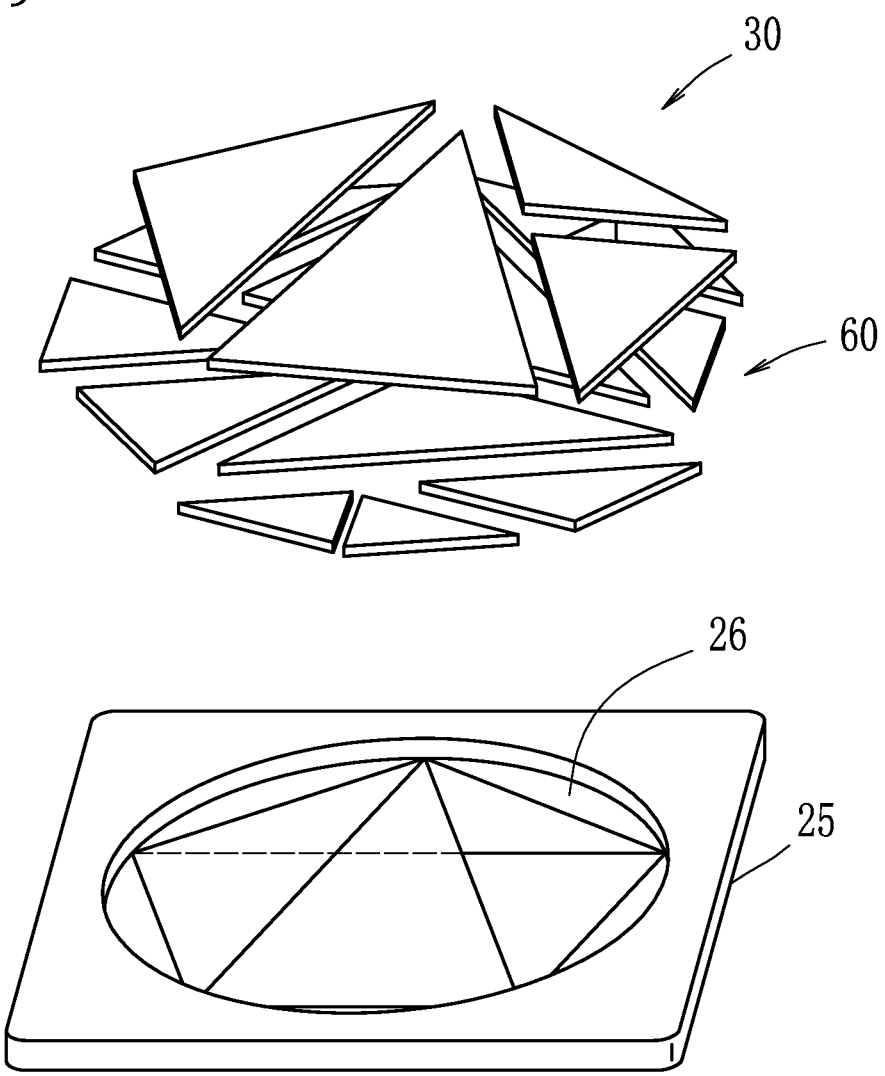
FIG. 19 is a plan view showing an example in which the number of the triangular plates included in the figure plate set is further increased in the second embodiment of the present invention.

FIG. 19 shows an example in which the number of the triangular plates included in the figure plate set is further increased. The figure plate set shown in FIG. 19 includes both a group of triangular plates 30 and a group of triangular plates 60. The group of triangular plates 30 can form the regular pentagon. The group of triangular plates 60 can form the regular decagon. By the above configuration, the group of triangular plates to be used can be selected as necessary. This can expand the range of learning. The group of triangular plates 30 and the group of triangular plates 60 can be placed on the plate member 25 in two layers. Therefore, same as the configuration shown in FIG. 12, the figure plate set 10 can be kept in an assembled state. Therefore, if a storage case is added, the figure plate set 10 can be easily carried.

As explained above, in the figure plate set for learning of the present invention, a plate member having a concave portion and a group of triangular plates including the first triangular plate and the second triangular plate are provided, a plurality of groups of triangular plates is provided, a regular pentagon or a regular decagon can be formed by combining one of the groups of triangular plates, and the plurality of groups of triangular plates can be stored by being stacked in the concave portion.

Figure 20:
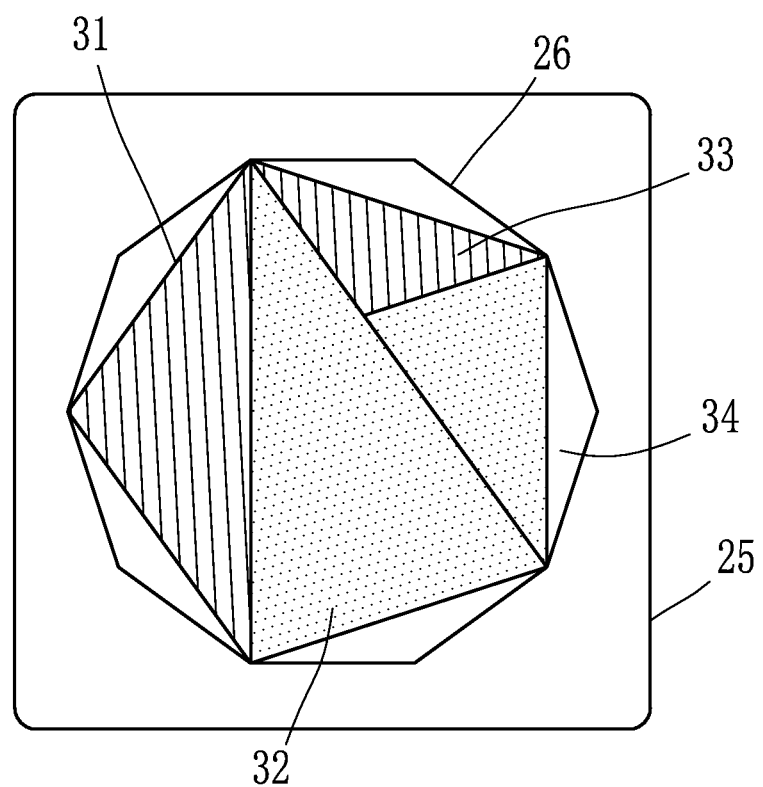
FIG. 20 is a plan view showing an example in which the concave portion is formed to a regular decagon in the second embodiment of the present invention.

In the above described embodiment, the concave portion 26 of the plate member 25 has the circular shape. However, the shape of the concave portion 26 is not limited to the circular shape. If the concave portion 26 has a shape of the regular decagon, in addition to the combined plate having a shape of the regular decagon, the combined plate having a shape of the regular pentagon can be placed along the inner peripheral wall of the concave portion 26. FIG. 20 is a plan view showing an example in which the concave portion 26 is formed to the regular decagon. In FIG. 20, the concave portion 26 shown in FIG. 13 is changed to a shape of the regular decagon. As shown in FIG. 20, the apexes of the regular pentagon formed by the triangular plates 31 to 34 are in contact with the concave portion 26.

By the above configuration, the triangular plates 31 to 34 are placed on the concave portion 26 and the regular pentagon is formed so that the apexes of the triangular plates 31 to 34 are in contact with the inner peripheral wall of the concave portion 26 having a shape of the regular decagon. Therefore, the user can recognize a relation between the regular decagon and the regular pentagon inscribed in the regular decagon through the above described placement work. Thus, the learning effect is improved.

The concave portion 26 has a shape of the regular decagon and the combined plates placed on the concave portion 26 have a shape of the regular pentagon. Therefore, a clearance is formed between the sides of the placed triangular plates 31 to 34 and the inner peripheral wall of the concave portion 26. Because of the clearance, the user can easily remove the placed triangular plates. Therefore, a concave portion made especially for removal is not required. Furthermore, the combined plates having a shape of the regular decagon and the combined plates having a shape of the regular pentagon can be placed on the concave portion 26 having a shape of the regular decagon in two layers. In other words, even if the shape of the concave portion 26 is changed to the regular decagon in the configuration of FIG. 19, the group of triangular plates 60 formed in a shape of the regular decagon and the group of triangular plates 30 formed in a shape of the regular pentagon can be placed on the concave portion 26 in two layers.

Only the triangular plates are fitted into the plate member 25 in the configuration having the plate member 25 shown in FIG. 8. However, a protractor, a straight plate, a compass or other tools can be fitted into the plate member 25 at a position avoiding the triangular plates. Materials of the triangular plates are not particularly limited. Resin materials and paper materials can be used, for example.

FIGS. 1 to 4 show an example of using indicators of both the angles and the marks 20 for indicating the angles. However, one of them or both of them can be omitted. Even if the angles are not indicated, the user can recognize the angles and learn the figures by simultaneously using the above described guide.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A figure plate set for learning, comprising:
   a first triangular plate that has an isosceles triangular shape having an apex angle of 108° and base angles of 36°; and
   a second triangular plate that has an isosceles triangular shape having an apex angle of 36° and base angles of 72°, wherein
   a length of isosceles sides of the first triangular plate is same as a length of isosceles sides or a bottom side of the second triangular plate,
   a new triangular shape can be formed by combining the first triangular plate and the second triangular plate, and
   an indicator indicating a triangle having the same angles as the first triangular plate or the second triangular plate on which the indicator is indicated or another indicator of a regular pentagon is indicated on at least one of the first triangular plate and the second triangular plate.

2. A figure plate set for learning, comprising:
   a first triangular plate that has an isosceles triangular shape having an apex angle of 108° and base angles of 36°; and
   a second triangular plate that has an isosceles triangular shape having an apex angle of 36° and base angles of 72°, wherein
   a length of isosceles sides of the first triangular plate is same as a length of isosceles sides or a bottom side of the second triangular plate,
   a new triangular shape can be formed by combining the first triangular plate and the second triangular plate,
   a plate member having a circular concave portion and a group of triangular plates including the first triangular plate and the second triangular plate are provided, and
   a regular pentagon or a regular decagon inscribed in the circular concave portion can be formed by combining the group of triangular plates.

3. A figure plate set for learning, comprising:
   a first triangular plate that has an isosceles triangular shape having an apex angle of 108° and base angles of 36°; and
   a second triangular plate that has an isosceles triangular shape having an apex angle of 36° and base angles of 72°, wherein
   a length of isosceles sides of the first triangular plate is same as a length of isosceles sides or a bottom side of the second triangular plate,
   a new triangular shape can be formed by combining the first triangular plate and the second triangular plate,
   a plate member having a concave portion of a regular decagon and a group of triangular plates including the first triangular plate and the second triangular plate are provided, and
   a regular pentagon inscribed in the concave portion of the regular decagon can be formed by combining the group of triangular plates.

4. The figure plate set according to claim 1, wherein
   a group of triangular plates including the first triangular plate and the second triangular plate are provided, and
   a regular pentagon or a regular decagon can be formed by combining the group of triangular plates.

5. The figure plate set according to claim 1, wherein
a plate member having a concave portion and a group of triangular plates including the first triangular plate and the second triangular plate are provided, and
the group of triangular plates can be positioned so that sides or apexes of the triangular plates are in contact with an inner peripheral wall of the concave portion.

6. The figure plate set according to claim 1, wherein
a plate member having a circular concave portion and a group of triangular plates including the first triangular plate and the second triangular plate are provided, and
a regular pentagon or a regular decagon inscribed in the circular concave portion can be formed by combining the group of triangular plates.

7. The figure plate set according to claim 1, wherein
a plate member having a concave portion of a regular decagon and a group of triangular plates including the first triangular plate and the second triangular plate are provided, and
a regular pentagon inscribed in the concave portion of the regular decagon can be formed by combining the group of triangular plates.

8. The figure plate set according to claim 1, wherein
a plate member having a concave portion and a group of triangular plates including the first triangular plate and the second triangular plate are provided,
a plurality of groups of triangular plates is provided,
a regular pentagon or a regular decagon can be formed by combining one of the groups of triangular plates, and
the plurality of groups of triangular plates can be stored by being stacked in the concave portion.

9. The figure plate set according to claim 2, wherein
at least one of the regular pentagon or the regular decagon inscribed in the circular concave portion is indicated on the plate member.

10. The figure plate set according to claim 2, wherein
an indicator indicating a triangle having the same angles as the first triangular plate or the second triangular plate on which the indicator is indicated or another indicator of a regular pentagon is indicated on at least one of the first triangular plate and the second triangular plate.

11. The figure plate set according to claim 1, wherein
the regular pentagon is formed as a hole having a regular pentagonal shape.

12. The figure plate set according to claim 1, wherein
another indicator indicating another triangle having the same angles as the first triangular plate or the second triangular plate on which the indicator is indicated and another indicator of another regular pentagon are further indicated inside the regular pentagon.

13. The figure plate set according to claim 1, wherein
marks are indicated near apexes of the first triangular plate and the second triangular plate, and a number of the marks varies according to an angle of each of the apexes.

14. The figure plate set according to claim 1, wherein
at least a part of apexes of the first triangular plate and the second triangular plate is chamfered.

15. The figure plate set according to claim 1, wherein
a plurality of figure plates included in the figure plate set is classified by color according to a kind of a triangle.

16. The figure plate set according to claim 1, wherein
at least one of a plurality of figure plates included in the figure plate set is classified by color so that the triangle having the same angles as the first triangular plate or the second triangular plate on which the indicator is indicated can be recognized by the one of the plurality of figure plates.

* * * * *